United States Patent
Dagar et al.

(10) Patent No.: US 11,748,435 B2
(45) Date of Patent: Sep. 5, 2023

(54) CONTENT-FREE SYSTEM AND METHOD TO RECOMMEND NEWS AND ARTICLES

(71) Applicant: S&P Global Inc., New York, NY (US)

(72) Inventors: Alka Dagar, New Delhi (IN); Ratheen Chaturvedi, Gurgaon (IN)

(73) Assignee: S&P Global Inc., New York, NY (US)

( * ) Notice: Subject to any disclaimer, the term of this patent is extended or adjusted under 35 U.S.C. 154(b) by 0 days.

(21) Appl. No.: 17/302,090

(22) Filed: Apr. 23, 2021

(65) Prior Publication Data

US 2022/0342945 A1 Oct. 27, 2022

(51) Int. Cl.
*G06F 16/9535* (2019.01)
*G06F 16/957* (2019.01)
*G06N 20/00* (2019.01)
*G06F 16/951* (2019.01)

(52) U.S. Cl.
CPC .......... *G06F 16/957* (2019.01); *G06F 16/951* (2019.01); *G06F 16/9535* (2019.01); *G06N 20/00* (2019.01)

(58) Field of Classification Search
CPC .. G06F 16/9535; G06F 16/957; G06F 16/951; G06N 20/00
See application file for complete search history.

(56) References Cited

U.S. PATENT DOCUMENTS

| | | | | |
|---|---|---|---|---|
| 7,706,740 | B2 * | 4/2010 | Collins | H04H 60/13 455/3.06 |
| 8,244,740 | B2 * | 8/2012 | Gruenhagen | G06F 16/337 706/45 |
| 10,404,816 | B2 * | 9/2019 | Chuchro | H04L 67/02 |
| 10,565,518 | B2 * | 2/2020 | Jin | H04L 67/22 |
| 10,795,900 | B1 * | 10/2020 | Satuluri | G06F 16/907 |
| 11,443,005 | B2 * | 9/2022 | Sadahiro | G06F 16/9535 |
| 2006/0059225 | A1 * | 3/2006 | Stonehocker | G06F 16/9562 709/202 |
| 2014/0279190 | A1 * | 9/2014 | Severinghaus | G06Q 30/0631 705/26.7 |
| 2016/0063065 | A1 * | 3/2016 | Khatri | G06Q 30/02 707/723 |
| 2021/0217053 | A1 * | 7/2021 | Yu | G06Q 30/0254 |

* cited by examiner

*Primary Examiner* — Alvin H Tan
(74) *Attorney, Agent, or Firm* — Yee & Associates, P.C.

(57) ABSTRACT

A computer-implemented method of recommending information sources is provided. The method comprising collecting raw user log data of a browser user and transforming the raw user log data to remove data that is specific to the user, wherein the transformed user log data comprises only general pages visited. A number of key page mappings are appended to the transformed user log data. A machine learning model determines a user interaction function according to the transformed user log data and generates a number of web page recommendations, wherein each web page recommendation has a respective probability of engagement based on the user interaction function. The web page recommendations are then displayed to the user on an interface.

27 Claims, 7 Drawing Sheets

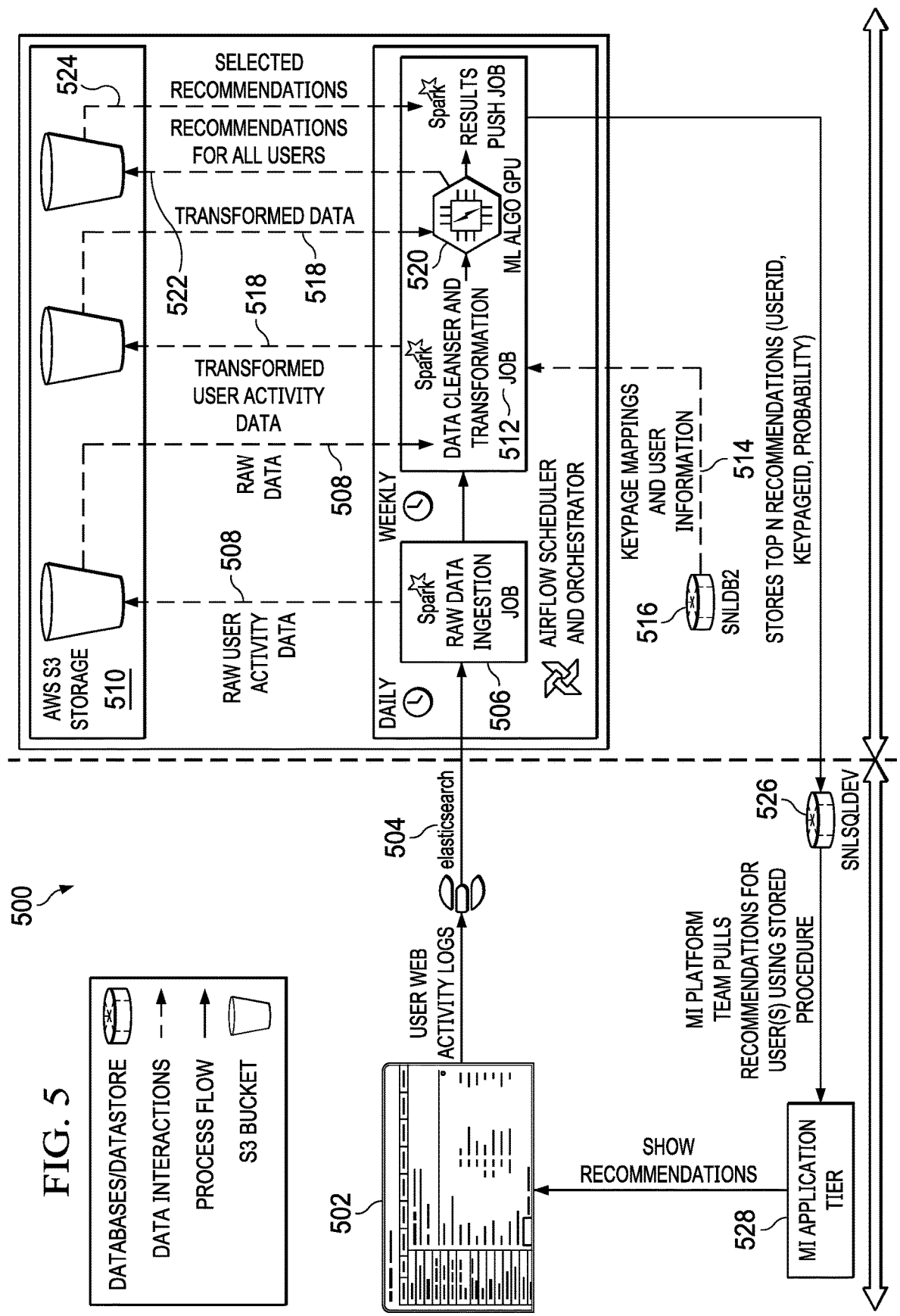

| Sector | Banking&Finance(N... ▼ | Select Us... ▼ | 26 |
|---|---|---|---|

606  608  610

History

| Visited Pages | Engagement Score |
|---|---|
| company/profile | 79.02 |
| Financial Highlights - Bank and Thrift Financial Highlights - Hy.. | 11.14 |
| company/officerbio | 10.27 |
| company/globalbankbranchmap | 8.09 |
| mna/dealoverview | 7.36 |
| company/recentdocuments | 4.90 |
| company/transactionssummary | 4.53 |
| company/officers | 4.18 |
| company/documents | 2.97 |
| company/corporatestructure | 2.81 |
| Balance Sheet - Bank and Thrift Balance Sheet - FIG - Hydra | 2.70 |
| company/briefingbooknews | 2.16 |
| company/mandahistory | 1.96 |
| offering/capitalofferingprofile | 1.94 |
| company/stock | 1.86 |
| mna/documents | 1.65 |
| Regulartory Financial Highlights - Commercial Banks Financial.. | 1.61 |
| Regulartory Financial Highlights - BHC Financial Report - Hydra | 0.98 |
| markets/capitalofferingsummary | 0.98 |

Recommendations  612

| Recommendation1 | Probability |
|---|---|
| company/documents | 92.00% |
| company/corporatestructure | 87.00% |
| mna/dealoverview | 87.00% |
| company/ownershiphistory | 85.00% |
| company/transcriptsdetails | 78.00% |
| company/companycalendar | 76.00% |
| company/debtmaturityprofile | 76.00% |
| company/creditratings | 71.00% |
| repbuilder/report | 71.00% |
| company/keyexhibits | 65.00% |
| office/screener | 65.00% |
| company/publicholdingsdetailed | 63.00% |
| company/analystcoverage | 57.00% |
| company/committeemembership | 57.00% |
| company/insideractivity | 57.00% |
| news/document | 54.00% |

614

| Title |
|---|
| Managing Director |

602

| Organization Name |
|---|
| Business 1, Inc. |

604

CONTENT-FREE SYSTEM AND METHOD TO RECOMMEND NEWS AND ARTICLES

BACKGROUND INFORMATION

1. Field

The present disclosure relates generally to an improved computing system, and more specifically to a method of recommending information sources based on user search behavior without compromising user privacy.

2. Background

Users searching for information online are often presented with the daunting task of finding relevant information of interest. Even with the help of online search engines, the user might still be faced with information overload from overly broad search results.

Therefore, it would be desirable to have a method and apparatus that take into account at least some of the issues discussed above, as well as other possible issues.

SUMMARY

An illustrative embodiment provides a computer-implemented method of recommending information sources. The method comprising collecting raw user log data of a browser user and transforming the raw user log data to remove data that is specific to the user, wherein the transformed user log data comprises only general pages visited. A number of key page mappings are appended to the transformed user log data. A machine learning model determines a user interaction function according to the transformed user log data and generates a number of web page recommendations, wherein each web page recommendation has a respective probability of engagement based on the user interaction function. The web page recommendations are then displayed to the user on an interface.

Another illustrative embodiment provides a system for recommending information sources. The system comprises a storage device configured to store program instructions and one or more processors operably connected to the storage device and configured to execute the program instructions to cause the system to: collect raw user log data of a browser user; transform the raw user log data to remove data that is specific to the user, wherein the transformed user log data comprises only general pages visited; append a number of key page mappings to the transformed user log data; determine, by a machine learning model, a user interaction function according to the transformed user log data; generate, by the machine learning model, a number of web page recommendations, wherein each web page recommendation has a respective probability of engagement based on the user interaction function; and display the web page recommendations to the user on an interface.

Another illustrative embodiment provides a computer program product for recommending information sources. The computer program product comprises a computer-readable storage medium having program instructions embodied thereon to perform the steps of: collecting raw user log data of a browser user; transforming the raw user log data to remove data that is specific to the user, wherein the transformed user log data comprises only general pages visited; appending a number of key page mappings to the transformed user log data; determining, by a machine learning model, a user interaction function according to the transformed user log data; generating, by the machine learning model, a number of web page recommendations, wherein each web page recommendation has a respective probability of engagement based on the user interaction function; and displaying the web page recommendations to the user on an interface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 depicts a diagram illustrating the operation of a recommendation system in accordance with an illustrative embodiment;

FIG. 6 depicts a diagram illustrating a dashboard for a recommendation engine in accordance with an illustrative embodiment;

DETAILED DESCRIPTION

The illustrative embodiments recognize and take into account one or more different considerations. The illustrative embodiments recognize and take into account that users searching for information online are often presented with the daunting task of finding relevant information of interest. Even with the help of online search engines, the user might still be faced with information overload from overly broad search results. To alleviate some of the information overload, recommendation systems have been developed that recommend information sources/pages based on past user activity online.

The illustrative embodiments also recognize and take into account that current recommendation systems typically use the content information viewed during past user searches and online activity to recommend new content and information sources. Such use of past content information can potentially compromise user privacy.

The illustrative embodiments provide a method for recommending web pages to a user based on the user's historical usage patterns. Content is selected that is relevant to each user based on user interests and past interactions, thereby alleviating information overload on the user. In contrast to other recommendation approaches, the illustrative embodiments do not use explicit content information viewed by a user, thereby preserving user privacy. The illustrative embodiment leverage the pages seen by users without explicit ratings or information on the content seen, whereas standard approaches use explicit content.

The illustrative embodiments leverage meta-information (structure, indices) of pages visited by users. This meta-information is used to train a Neural Collaborative Filtering Model (a deep learning methodology) to predict new page indices to users based on their past interactions. The neural network architecture of the illustrative embodiments model latent information of users and items (pages of content) and devise a system that uses collaborative filtering without content data.

Figure 1:
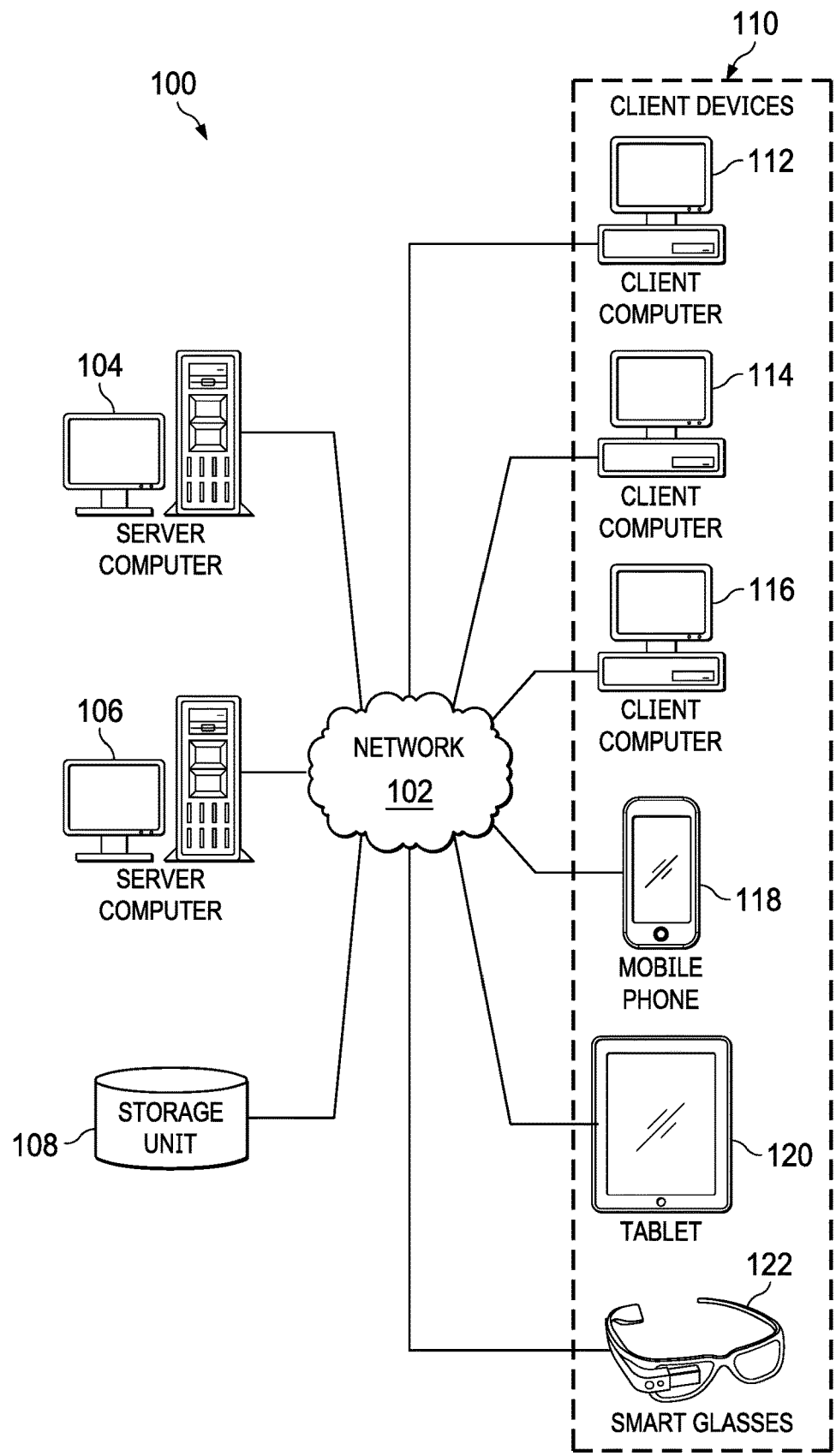
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
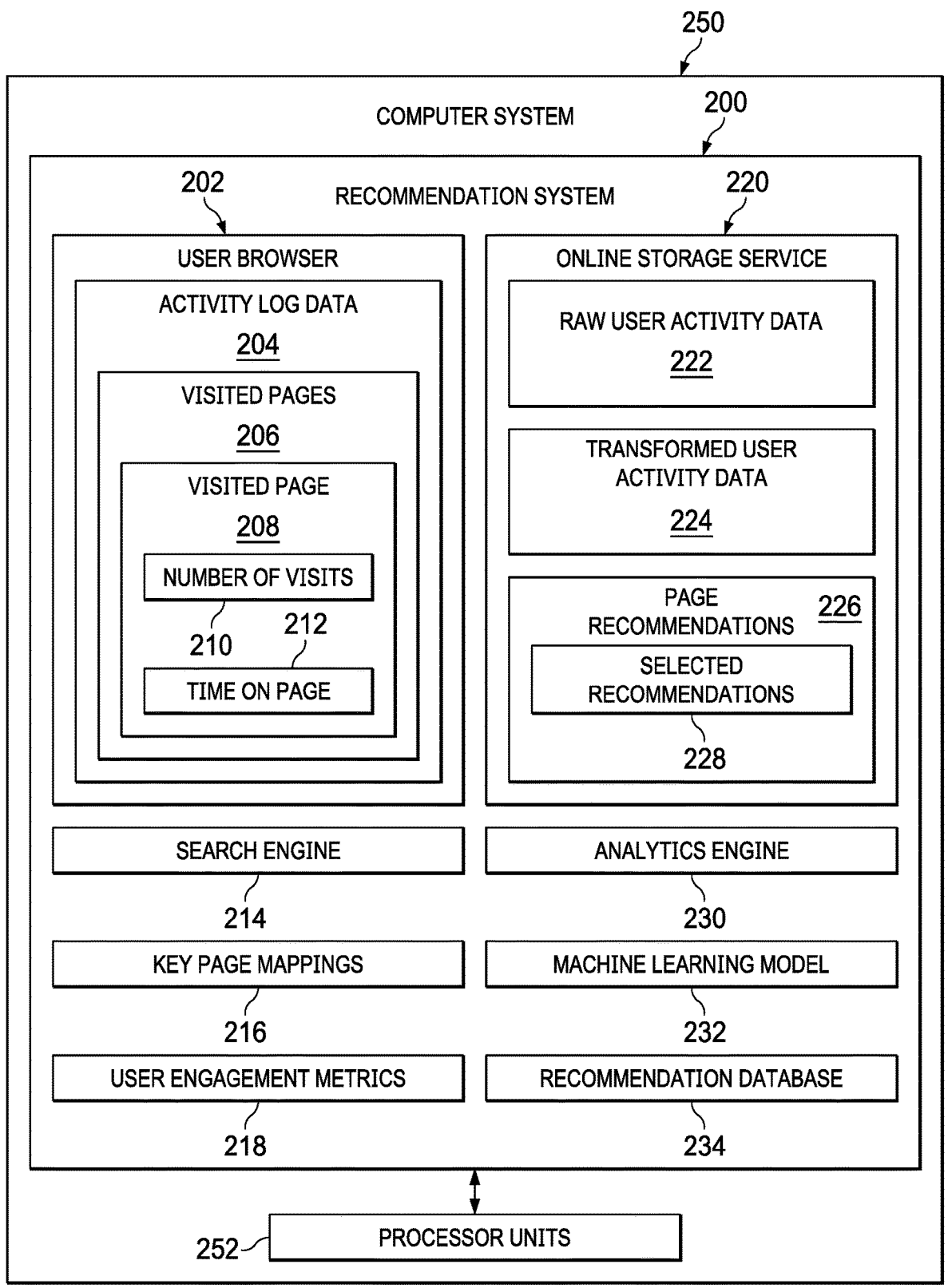
FIG. 2 is a block diagram of a recommendation system depicted in accordance with an illustrative embodiment.

FIG. 2 is a block diagram of a recommendation system depicted in accordance with an illustrative embodiment. Recommendation system 200 might be implemented in network data processing system 100 in FIG. 1.

Recommendation system 200 operates on information from a user browser 202. User browser 202 contains user activity log data 204 regarding web pages 206 visited by the user. The activity data for each visited page 208 comprises the number of visits 210 the user makes to the page and the total time 212 spent on the page. Activity log data 204 is collected in real time by search engine 214.

Analytics engine 230 receives raw user activity data 222 from search engine 214, which it stores in online stage service 220. Analytics engine 230 generates transformed user activity data 224 from the raw user activity data 222 by removing pages that are not relevant (e.g., logins, help pages, etc.). Analytics engine 230 might append key page mappings 216 and past user engagement metrics 218 to transformed user activity data 224.

Machine learning model/engine 232 uses transformed user activity data 224 to generate selected recommendations 228. Selected recommendations 228 may be chosen from recommendations 226 and stored in recommendations database 234, from which user browser 202 can pull the selected recommendations for display to the user.

Recommendation system 200 can be implemented in software, hardware, firmware, or a combination thereof. When software is used, the operations performed by recommendation system 200 can be implemented in program code configured to run on hardware, such as a processor unit. When firmware is used, the operations performed by recommendation system 200 can be implemented in program code and data and stored in persistent memory to run on a processor unit. When hardware is employed, the hardware may include circuits that operate to perform the operations in recommendation system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components for recommendation system 200 can be located in computer system 250, which is a physical hardware system and includes one or more data processing systems. When more than one data processing system is present in computer system 250, those data processing systems are in communication with each other using a communications medium. The communications medium can be a network. The data processing systems can be selected from at least one of a computer, a server computer, a tablet computer, or some other suitable data processing system.

For example, recommendation system 200 can run on one or more processors 252 in computer system 250. s used herein a processor unit is a hardware device and is comprised of hardware circuits such as those on an integrated circuit that respond and process instructions and program code that operate a computer. When one or more processors 252 execute instructions for a process, one or more processors 252 that can be on the same computer or on different computers in computer system 250. In other words, the process can be distributed between processors 252 on the same or different computers in computer system 250. Further, one or more processors 252 can be of the same type or different type of processors 252. For example, one or more processors 252 can be selected from at least one of a single core processor, a dual-core processor, a multi-processor core, a general-purpose central processing unit (CPU), a graphics processing unit (GPU), a digital signal processor (DSP), or some other type of processor.

There are three main categories of machine learning: supervised, unsupervised, and reinforced learning. Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

Whereas supervised and unsupervised methods learn from a dataset, reinforced learning (RL) methods learn from feedback to re-learn/retrain the models. Algorithms are used to train the predictive model through interacting with the environment using measurable performance criteria.

Figure 3:
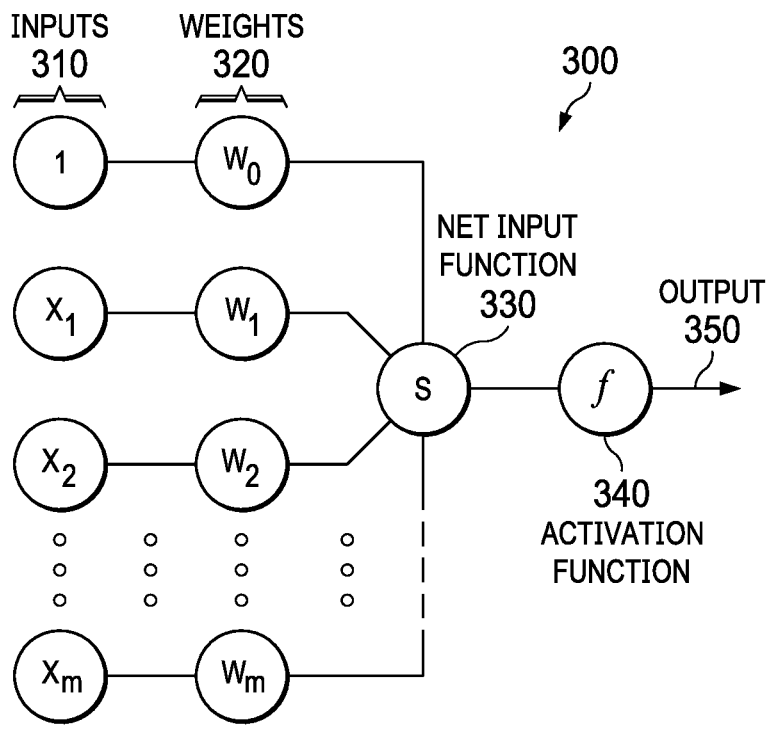
FIG. 3 depicts a diagram illustrating a node in a neural network in which illustrative embodiments can be implemented.

FIG. 3 depicts a diagram illustrating a node in a neural network in which illustrative embodiments can be implemented. Node 300 combines multiple inputs 310 from other nodes. Each input 310 is multiplied by a respective weight 320 that either amplifies or dampens that input, thereby assigning significance to each input for the task the algorithm is trying to learn. The weighted inputs are collected by a net input function 330 and then passed through an activation function 340 to determine the output 350. The connections between nodes are called edges. The respective weights of nodes and edges might change as learning proceeds, increasing or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Figure 4:
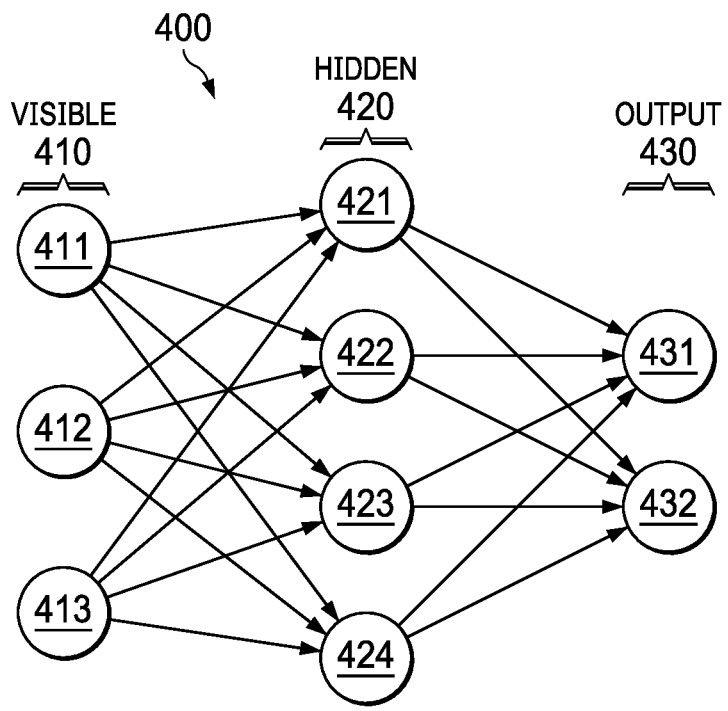
FIG. 4 depicts a diagram illustrating a neural network in which illustrative embodiments can be implemented.

FIG. 4 depicts a diagram illustrating a neural network in which illustrative embodiments can be implemented. As shown in FIG. 4, the nodes in the neural network 400 are divided into a layer of visible nodes 410, a layer of hidden nodes 420, and a layer of output nodes 430. The nodes in these layers might comprise nodes such as node 300 in FIG. 3. The layer of visible nodes 410 are those that receive information from the environment (i.e., a set of external training data). Each visible node in the layer of visible nodes 410 takes a low-level feature from an item in the dataset and passes it to the hidden nodes in the next layer of hidden nodes 420. When a node in the layer of hidden nodes 420 receives an input value x from a visible node in the layer of visible nodes 410 it multiplies x by the weight assigned to that connection (edge) and adds it to a bias b. The result of these two operations is then fed into an activation function which produces the node's output.

In fully connected feed-forward networks, each node in one layer is connected to every node in the next layer. For example, node 421 receives input from all of the visible nodes 411, 412, and 413 each x value from the separate nodes is multiplied by its respective weight, and all of the products are summed. The summed products are then added to the hidden layer bias, and the result is passed through the activation function to produce output to output nodes 431 and 432 in layer of output nodes 430. A similar process is repeated at hidden nodes 422, 423, and 424. In the case of a deeper neural network, the outputs of hidden layer 420 serve as inputs to the next hidden layer.

FIG. 5 depicts a diagram illustrating the operation of a recommendation system in accordance with an illustrative embodiment. System 500 might be an example of recommendation system 200 shown in FIG. 2.

As the user browses online with browser 502, a search engine 504 such as, e.g., Elasticsearch®, captures the user logs in real time. The user log data might comprise, e.g., which page uniform resource locators (URLs) were accessed, the number of visits to each URL, the time spent on each URL, etc. Search engine 504 indexes the raw user log data and outputs the results in JavaScript Object Notation (JSON) format.

An analytics engine, e.g., Spark, performed a raw data ingestion job 506 for the raw user log data captured by search engine 504 and saves the raw data 508 to an online storage service 510, e.g., AWS® S3. Raw data ingestion job 506 might be performed daily or at another frequent periodic time interval.

At a second periodic interval, e.g., weekly, the analytics engine performs a data cleanser and transformation job 512 on the data. Data cleanser and transformation job 512 might comprise removing pages that are not relevant, e.g., logins, help, sign-ups, personal dashboards, etc.—essentially any page that is not a general page that can be consumed by any user.

Key page mappings and user engagement metrics 514 stored in a database 516 might then be appended to the transformed user activity data. The engagement metrics may comprise historical user browsing data covering a specified time period, e.g., 12-14 months. Key page mappings might comprise generic identifiers (IDs) of pages that the user has visited. Generic IDs refers to the type of page in question. For example, many organizations might have a People Summary page that lists members/employees of the organization in question. Regardless of the organization/company in question, the generic ID for the People Summary page will be the same.

The user engagement metrics describe the number of times a user visits a page and the time spent on each page. From the engagement metrics, the analytic engine calculates an engagement score for each web page visited by the user. The time spent on a page by the user might be aggregated over a specified period of time with total number of visits.

The transformed user activity data 518 is then fed into to a machine learning model 520. The machine model determines a function/pattern of user and page interaction. Based on the user latent feature (the vector representing the user profile) and the user's interaction previous pages, the function can be learned linearly via matrix factorization and non-linearly via multi-layer perceptron (MLP). The linear and non-linear interaction is captured through a neural net layer that fuses the simple dot product and the MLP layer.

The machine learning model 520 generates page recommendations 522 according to the user's engagement function and the probability of a page match the user's interest. The model 520 may take the similarity of user latent vectors of users into account in making the recommendations 522.

Recommendations 522 might be pared down by selecting a subset of the top N recommendation 524 (see FIG. 6). The selected page recommendation 524 can be saved in a database 526 and then pulled by application tier 528 for display in browser 502.

FIG. 6 depicts a diagram illustrating a dashboard for a recommendation engine in accordance with an illustrative embodiment. Dashboard 600 includes information about the user, which might include a user's job title 602 and the organization 604, if any, to which the user belongs.

Dashboard 600 may organize data according to a specified topic such as, e.g., a designated industry sector 606. Dashboard displays a history 608 of searched pages related to the selected sector 606. Each entry in the search history 608 has a corresponding engagement score 618 based on the number of visits and total time the user spends on a given page over a given time period, e.g., a week.

Web page recommendations 612 a generated from the search history 608 and engagement scores 610. Each recommendation has a corresponding probability of engagement 614. The probability of engagement 614 represents the likelihood of a user engaging with that page and varies between 0 and 1. The higher the score, the greater the likelihood of repeat visits and time spent on the page by the user. The probability of engagement 614 are calculated by the machine learning model (i.e., model 520) after analyzing the user's past visits history 608. If the user is new and does not have a history, then the recommendations 612 may be based on the pages visited by all users.

A subset of the top N recommendations 612 might be selected for display to the user. For example, the top 5-6 recommendations might be shown to the user. The subset of recommendations might also be selected based on a minimum probability threshold, e.g., 0.6-0.7, wherein anything below the threshold is omitted from the recommendation.

Figure 7:
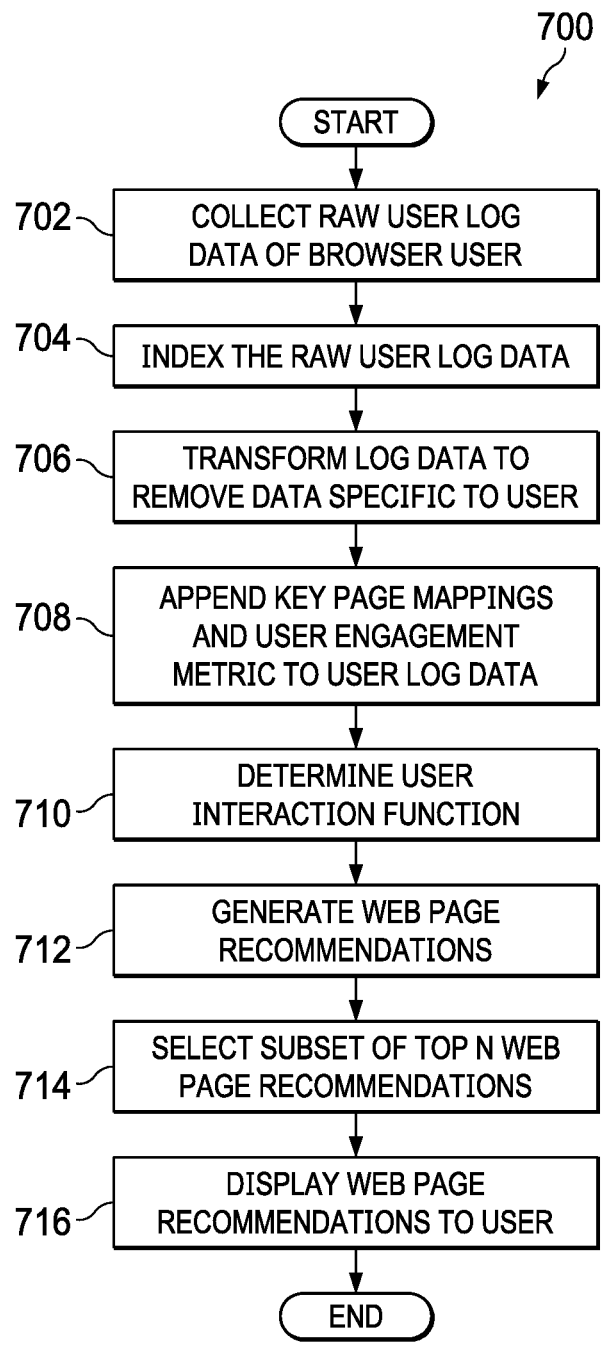
FIG. 7 depicts a flowchart illustrating a process for recommending information sources in accordance with an illustrative embodiment.

FIG. 7 depicts a flowchart illustrating a process for recommending information sources in accordance with an illustrative embodiment. Process 700 can be implemented in hardware, software, or both. When implemented in software, the process can take the form of program code that is run by one of more processor units located in one or more hardware devices in one or more computer systems. Process 700 might be implemented in recommendation system 200 in FIG. 2 and system 500 in FIG. 5.

Process 700 begins by collecting raw user log data of a browser user (step 702). The raw user log data may be collected and stored according to a first periodic time interval, e.g., daily. The raw user log data might then be indexed (step 704).

Process 700 transforms the raw user log data to remove data that is specific to the user (step 706). The transformed user log data comprises only general pages. Transforming the raw user log data and generating web page recommendations is performed according to a second period time interval, e.g., weekly.

A number of key page mappings and user engagement metrics are then appended to the transformed user log data (step 708).

A machine learning model determines a user interaction function according to the transformed user log data (step 710). The user interaction function may be learned linearly via matrix factorization. The user interaction function may also be learned nonlinearly via a multilayer perceptron.

The machine learning model then generates a number of web page recommendations (step 712). Each web page recommendation has a respective probability of engagement based on the user interaction function.

A subset comprising the top N number of web page recommendations might be selected according to their respective probabilities of engagement, wherein only this top N subset is displayed to the user (step 714).

The selected web page recommendations are then displayed to the user on a user interface (step 716). Process 700 then ends.

Figure 8:
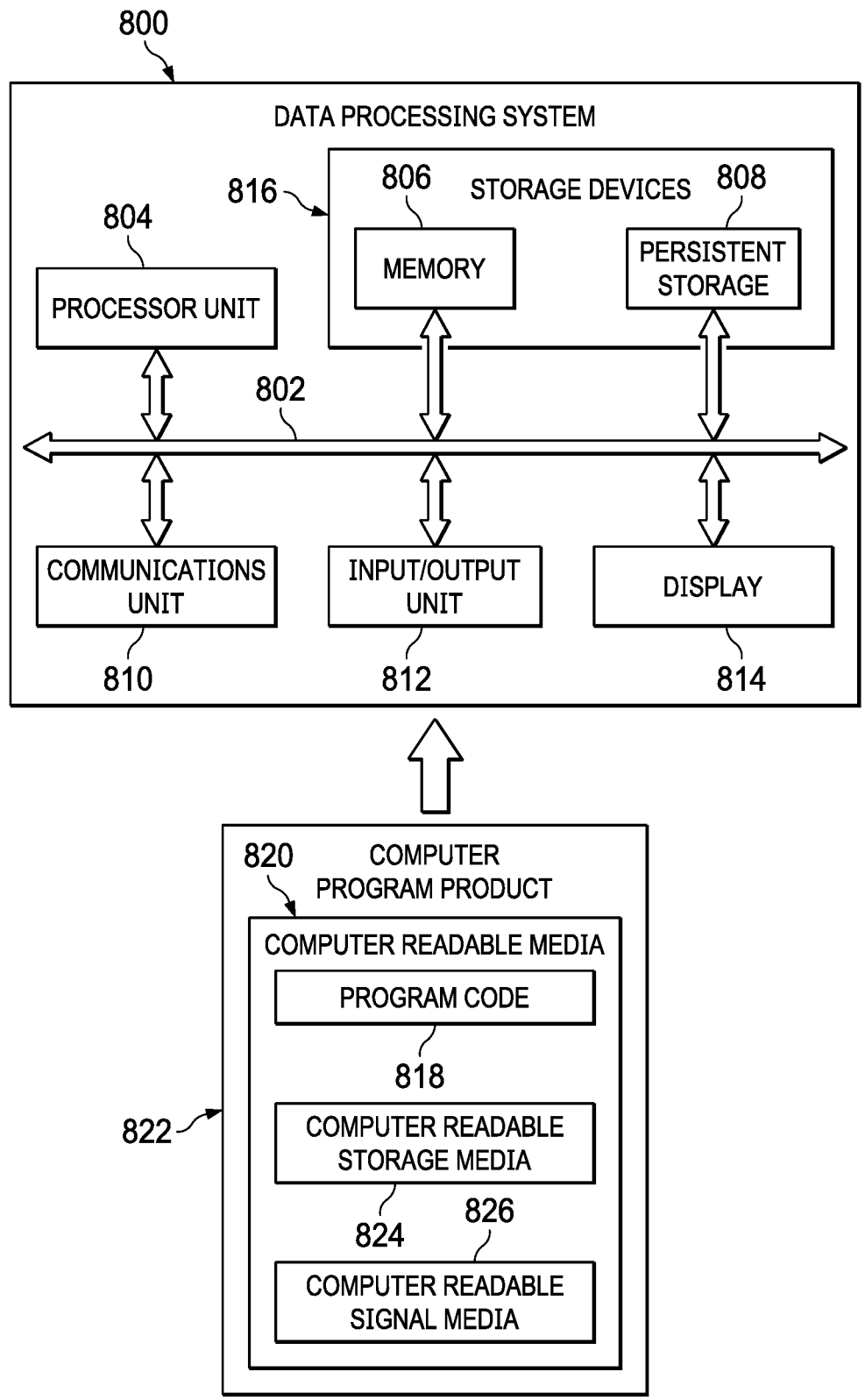
FIG. 8 is a block diagram of a data processing system in accordance with an illustrative embodiment.

Turning now to FIG. 8, an illustration of a block diagram of a data processing system is depicted in accordance with an illustrative embodiment. Data processing system 800 may be used to implement server computers 104 and 106 and client devices 110 in FIG. 1, as well as computer system 250 in FIG. 2. In this illustrative example, data processing system 800 includes communications framework 802, which provides communications between processor unit 804, memory 806, persistent storage 808, communications unit 810, input/output unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation. In an embodiment, processor unit 804 comprises one or more conventional general-purpose central processing units (CPUs). In an alternate embodiment, processor unit 804 comprises one or more graphical processing units (CPUs).

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, may be, for example, a random access memory or any other suitable volatile or non-volatile storage device.

Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808. Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer-usable program code, or computer-readable program code that may be read and executed by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for execution by processor unit 804. Program code 818 and computer-readable media 820 form computer program product 822 in these illustrative examples. In one example, computer-readable media 820 may be computer-readable storage media 824 or computer-readable signal media 826.

In these illustrative examples, computer-readable storage media 824 is a physical or tangible storage device used to store program code 818 rather than a medium that propagates or transmits program code 818. Computer readable storage media 824, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 818 may be transferred to data processing system 800 using computer-readable signal media 826. Computer-readable signal media 826 may be, for example, a propagated data signal containing program code 818. For example, computer-readable signal media 826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for recommending information sources, the method comprising:
using a number of processors to perform the steps of:
collecting raw user log data of a browser user;
transforming the raw user log data to remove data that is specific to the user including logins, sign-ups, and personal dashboards, wherein the transformed raw user log data comprises only general information regarding pages visited, wherein the general information comprises at least one of structure or indices of the pages visited, and wherein the general information excludes content of the pages visited and does not use explicit content information viewed by the user;
modifying the transformed raw user log data by appending a number of key page mappings and user engagement metrics to the transformed raw user log data, wherein the number of key page mappings comprises a generic identifier referring to a type of each of the pages visited;
determining, by a machine learning model, a user interaction function according to only the modified transformed raw user log data;
generating, by the machine learning model, a number of web page recommendations, wherein each web page recommendation has a respective probability of engagement based on the user interaction function;
receiving user input of a specified type of web page visited;
selecting a subset of the web page recommendations that were generated from the modified transformed user log data having the specified type of web page visited appended; and
displaying the subset of web page recommendations to the user on an interface.

2. The method of claim 1, further comprising indexing the raw user log data.

3. The method of claim 1, further comprising selecting a top N subset of the number of web page recommendations according to their respective probabilities of engagement, wherein only the top N subset of web recommendations is displayed to the user.

4. The method of claim 1, wherein the user interaction function is learned linearly via matrix factorization.

5. The method of claim 1, wherein the user interaction function is learned nonlinearly via a multilayer perceptron.

6. The method of claim 1, wherein the raw user log data is collected and stored according to a first periodic time interval.

7. The method of claim 6, wherein the first periodic time interval is daily.

8. The method of claim 1, wherein transforming the raw user log data and generating web page recommendations is performed according to a second period time interval comprising a data cleanser and transformation on the raw user log data, wherein the first period time interval is more frequent than the second period time interval.

9. The method of claim 8, wherein the second periodic time interval is weekly.

10. A system for recommending information sources, the system comprising:
a storage device configured to store program instructions; and
one or more processors operably connected to the storage device and configured to execute the program instructions to cause the system to:
collect raw user log data of a browser user;
transform the raw user log data to remove data that is specific to the user including logins, sign-ups, and personal dashboards, wherein the transformed raw user log data comprises only general information regarding pages visited, wherein the general information comprises at least one of structure or indices of the pages visited, and wherein the general information excludes content of the pages visited and does not use explicit ratings or information on the content seen by the user;
modify the transformed raw user log data by appending a number of key page mappings and user engagement metrics to the transformed raw user log data, wherein the number of key page mappings comprises a generic identifier referring to a type of each of the pages visited;
determine, by a machine learning model, a user interaction function according to only the modified transformed raw user log data;
generate, by the machine learning model, a number of web page recommendations, wherein each web page recommendation has a respective probability of engagement based on the user interaction function;
receive user input of a specified type of web page visited;
select a subset of the web page recommendations that were generated from the modified transformed user log data having the specified type of web page visited appended; and
display the subset of web page recommendations to the user on an interface.

11. The system of claim 10, further comprising indexing the raw user log data.

12. The system of claim 10, further comprising selecting a top N subset of the number of web page recommendations according to their respective probabilities of engagement, wherein only the top N subset of web recommendations is displayed to the user.

13. The system of claim 10, wherein the user interaction function is learned linearly via matrix factorization.

14. The system of claim 10, wherein the user interaction function is learned nonlinearly via a multilayer perceptron.

15. The system of claim 10, wherein the raw user log data is collected and stored according to a first periodic time interval.

16. The system of claim 15, wherein the first periodic time interval is daily.

17. The system of claim 10, wherein transforming the raw user log data and generating web page recommendations is performed according to a second period time interval comprising a data cleanser and transformation on the raw user log data, wherein the first period time interval is more frequent than the second period time interval.

18. The system of claim 17, wherein the second periodic time interval is weekly.

19. A computer program product for recommending information sources, the computer program product comprising:
a computer-readable storage medium having program instructions embodied thereon to perform the steps of:
collecting raw user log data of a browser user;
transforming the raw user log data to remove data that is specific to the user including logins, sign-ups, and personal dashboards, wherein the transformed raw user log data comprises only general information regarding pages visited, wherein the general information comprises at least one of structure or indices of the pages visited, and wherein the general information excludes content of the pages visited and does not use explicit ratings or information on the content seen by the user;
modifying the transformed raw user log data by appending a number of key page mappings and user engagement metrics to the transformed raw user log data, wherein the number of key page mappings comprises a generic identifier referring to a type of each of the pages visited;
determining, by a machine learning model, a user interaction function according to only the modified transformed raw user log data;
generating, by the machine learning model, a number of web page recommendations, wherein each web page recommendation has a respective probability of engagement based on the user interaction function;
receive user input of a specified type of web page visited;
select a subset of the web page recommendations that were generated from the modified transformed user log data having the specified type of web page visited appended; and
displaying the subset of web page recommendations to the user on an interface.

20. The computer program product of claim 19, further comprising indexing the raw user log data.

21. The computer program product of claim 19, further comprising selecting a top N subset of the number of web page recommendations according to their respective probabilities of engagement, wherein only the top N subset of web recommendations is displayed to the user.

22. The computer program product of claim 19, wherein the user interaction function is learned linearly via matrix factorization.

23. The computer program product of claim 19, wherein the user interaction function is learned nonlinearly via a multilayer perceptron.

24. The computer program product of claim 19, wherein the raw user log data is collected and stored according to a first periodic time interval.

25. The computer program product of claim 24, wherein the first periodic time interval is daily.

26. The computer program product of claim 19, wherein transforming the raw user log data and generating web page recommendations is performed according to a second period time interval comprising a data cleanser and transformation on the raw user log data, wherein the first period time interval is more frequent than the second period time interval.

27. The computer program product of claim 26, wherein the second periodic time interval is weekly.

* * * * *